(12) United States Patent
Chou et al.

(10) Patent No.: US 6,939,118 B2
(45) Date of Patent: Sep. 6, 2005

(54) MOLDING APPARATUS FOR TORIC CONTACT LENSES

(75) Inventors: Yu-Jan Chou, Taipei (TW); Chien-Hua Ku, Keelung (TW); Ming Lee, Tu Cheng (TW); Cheng-Liang Lee, Hsi Chih (TW)

(73) Assignee: St. Shine Optical Co., Ltd., Taipei Hsien (TW)

( * ) Notice: Subject to any disclaimer, the term of this patent is extended or adjusted under 35 U.S.C. 154(b) by 22 days.

(21) Appl. No.: 10/752,067

(22) Filed: Jan. 6, 2004

(65) Prior Publication Data
US 2005/0147705 A1   Jul. 7, 2005

(51) Int. Cl.[7] ............................................. B29D 11/00
(52) U.S. Cl. ..................... 425/192 R; 425/808; 249/104
(58) Field of Search ........................... 425/192 R, 193, 425/808; 249/104; 264/1.1, 2.5

(56) References Cited

U.S. PATENT DOCUMENTS

| | | | |
|---|---|---|---|
| 5,330,203 A | * | 7/1994 | Fleenor et al. ............. 279/46.3 |
| 5,611,970 A | * | 3/1997 | Apollonio et al. ........... 264/2.5 |
| 5,733,585 A | * | 3/1998 | Vandewinckel et al. 425/192 R |
| 6,197,227 B1 | * | 3/2001 | Appleton et al. ............. 264/1.1 |
| 6,491,393 B1 | * | 12/2002 | Appleton .................... 351/176 |
| 2002/0056801 A1 | * | 5/2002 | Dean .......................... 249/155 |

* cited by examiner

Primary Examiner—Donald Heckenberg
(74) Attorney, Agent, or Firm—Schneck & Schneck; Thomas Schneck

(57) ABSTRACT

A molding apparatus for generating toric contact lenses, comprises a convex inserter, a front convex inserter carrier, a rear convex inserter carrier, and a first and a second fasteners. The convex inserter, used to form a convex outer surface of toric contact lens, has positioning lines on its convex head. It is embedded in the front convex inserter carrier which also has positioning lines on its upper brim, jointing with the convex inserter, and an angle pointing line on its cylindrical surface. A first fastener is used to helically tighten the convex inserter to the front convex inserter carrier while a second fastener joining the front convex inserter carrier with the rear convex inserter carrier. The front convex inserter carrier is embedded in the rear convex inserter carrier which has a number of lines representing angles of astigmatism on its cylindrical surface.

4 Claims, 3 Drawing Sheets

MOLDING APPARATUS FOR TORIC CONTACT LENSES

BACKGROUND OF THE INVENTION

1. Field of the Invention

The invention relates to a molding apparatus for toric contact lenses. More particularly, the invention relates a molding apparatus for correcting angle of astigmatism with the toric contact lenses.

2. Description of the Prior Art

Astigmatism, a symptom of refractive abnormalities of the eye, refers to the phenomenon of imperfection image and incorrect place of focusing, where the refractive error creates superposed off-focus images, and in turn results in blurry and ghosted vision.

In general, there are two types of astigmatism: regular astigmatism and irregular astigmatism. A natural corneal surface should have a uniform curvature radius across its surface, spherically shaped like a basketball, whereas the astigmatism corneal shaped more like a rugby ball, differing in curvature between a steeper and a flatter meridians, has degree of astigmatism comparable to the difference in curvature radius of the two meridians. In the regular astigmatism, these two meridians generally have a constant curvature and are generally perpendicular to each other. Irregular astigmatism means the cornea may have more than two meridians of focus and they may not be 90° apart—in other words, the cornea has many irregularly shaped meridians at different angles.

In a normal eye, the cornea has a smooth surface and curvature, and its round surface is just like a basketball. Whereas, a person with astigmatism, has an oblong corneal surface shaped more like a rugby ball from end to end, rather than a round, spherical basketball. When light passes through an eye, the improperly shaped cornea bends different light rays at different meridians, which results in distorted and blurred vision. Cylindrical lenses are used to compensate for regular astigmatism.

A process flow for the production of toric contact lenses: providing a molding apparatus, a plastic mold is formed by injection molding through the use of the molding apparatus, casting a liquid monomer in the cavity of the plastic mold, polymerizing the monomer to form a solid, removing the lens from the cavity, and other processing steps, for example, hydration and extraction, may also be employed.

The molding apparatus comprises a convex inserter, a concave inserter, a convex inserter carrier, and a concave inserter carrier, wherein the convex inserter and convex inserter carrier are used for making a convex outer surface of toric contact lens, and the curvature in the head of the convex inserter shapes the curvature of the convex outer surface of the toric contact lens, and decides angle of astigmatism. The architectures of the convex inserter and convex inserter carrier are well known in the art, as discussed in U.S. Pat. No. 5,330,203.

However, in U.S. Pat. No. 5,330,203, the convex inserter and convex inserter carrier lack of labeling degree to an adjustment of angle of astigmatism, it is then impossible to adjust angle of astigmatism for toric contact lens directly through manipulating the inserter and the carrier; moreover, since the inserter and the carrier are deficient in positioning marks to each other, there is an absence of intense precision in adjusting astigmatism for the toric lens. Therefore, in the process of making toric lenses, without build-in positioning marks, it will be complicated to integrate precision calibration of astigmatism into the mold of machinery where the inserter and the carrier are installed.

The present invention offers a molding apparatus for toric contact lenses, capable of precisely and easily adjusting angle of astigmatism and its degrees, and relatively easy to assemble the inserter and the carrier in the mold of machinery while in the process of making lenses.

SUMMARY OF THE INVENTION

The present invention provides a molding apparatus for cast molding toric contact lenses, which comprises a convex inserter (inserter), a front convex inserter carrier (front carrier), a first fastener, a rear convex inserter carrier (rear carrier), and a second fastener. The inserter is used to form a convex outer surface of toric lens, wherein the positioning lines are carved on curved head of the inserter. The inserter is embedded in the front carrier which has a pair of positioning lines on its brim, and an angle pointing line on its cylindrical shell. The first fastener is used to helically tighten the inserter to the front carrier. The front carrier is embedded in the rear carrier which has a number of lines representing degrees of astigmatism. The second fastener is used to join the front carrier and the rear carrier.

The positioning lines on the brim of the front carrier are used to align with their counterparts on the inserter. Once the angle pointing line of the front carrier points any line on its cylindrical shell of the rear carrier, it is the exact degree of astigmatism for the corresponding toric contact lens.

The molding apparatus for toric lenses of the present invention further comprises a sleeve, where the inserter is inserted through the hollow of the sleeve, and fixed into the front carrier. The first fastener is a bolt which tightens the inserter to the front carrier by screwing into the internal thread of the inserter. Still, the second fastener is a bolt which tightens the front carrier to the rear carrier by screwing into the internal thread of the front carrier.

The purpose of the invention provides a molding apparatus for contact lenses, wherein the rear carrier has a number of lines representing reading degrees of astigmatic angles, capable of easily adjusting the astigmatic angle of convex outer surface for a contact lens; once an alignment is formed between the positioning lines of the inserter and the positioning lines of the front carrier, the astigmatic angle of a contact lens can be precisely produced; moreover, the structures of the inserter, the front carrier, and the rear carrier are plain enough to easily install in the mold of the machinery.

Other objects and advantages of the present invention will become apparent from the detailed description to follow taken in conjunction with the appended claims.

DETAILED DESCRIPTION OF THE INVENTION

Figure 1:
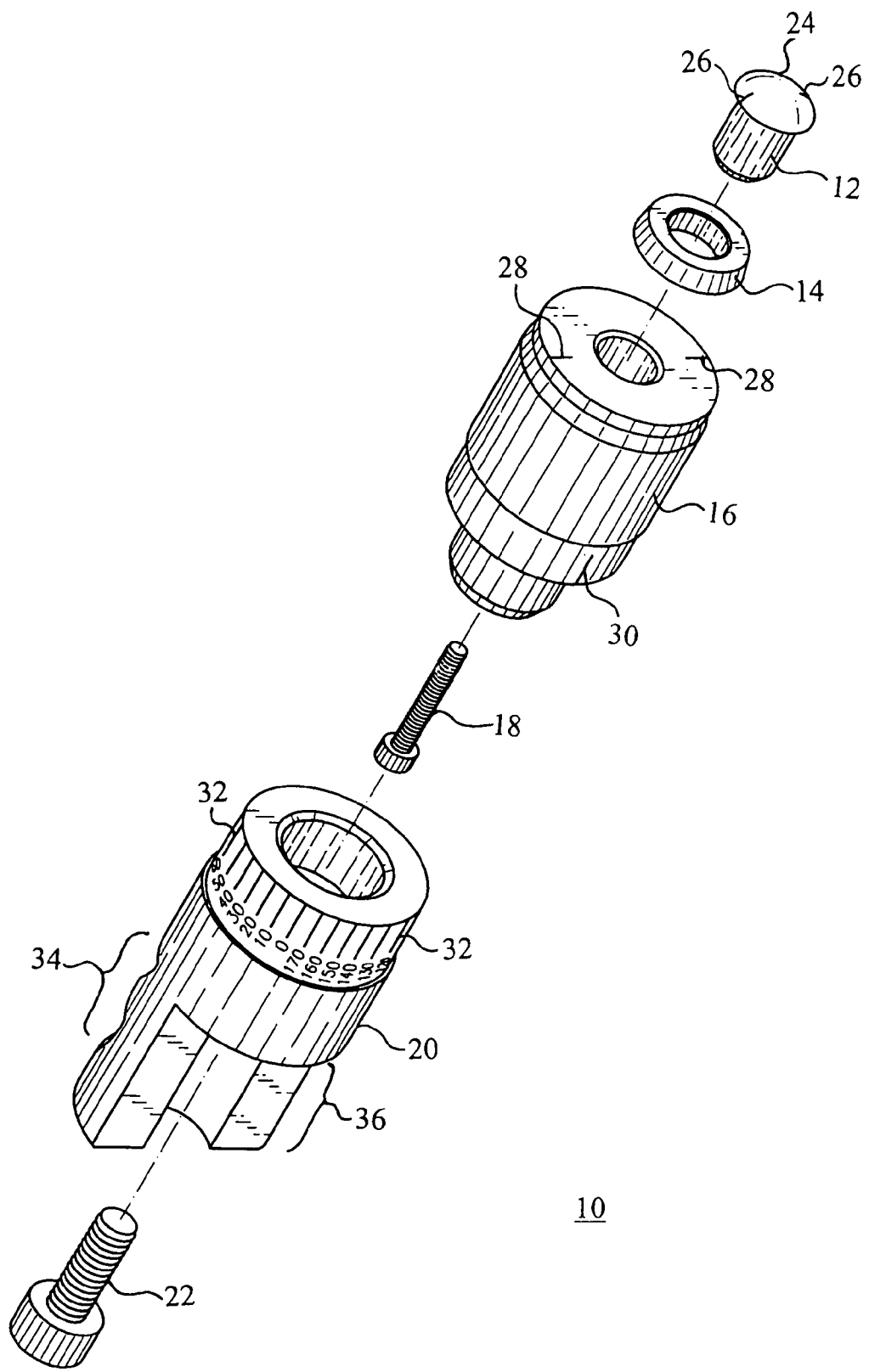
FIG. 1 is an exploded view of the invention according to a preferred embodiment.

FIG. 1 is an exploded view of the invention according to a preferred embodiment. Referring to FIG. 1, a molding apparatus 10 for the production of toric lenses comprises a convex inserter 12 (inserter 12), a sleeve 14, a front convex inserter carrier 16 (front carrier 16), a bolt—18 and 22 each, and a rear convex inserter carrier 20 (rear carrier 20).

The inserter 12 is used to form convex outer surface (not shown) of a toric lens, wherein the curvature of convex head 24 of the inserter 12 is equivalent to the curvature of the convex outer surface of the toric lens.

The convex head 24 of the inserter 12, helps to form optical zone of the convex outer surface of the lens and slab-off zones to stabilize the lens, and has positioning lines 26 which cause exact counterparts on the lens, providing toric-lens wearers an easy way to recognize the angle to wear.

Figure 2A:
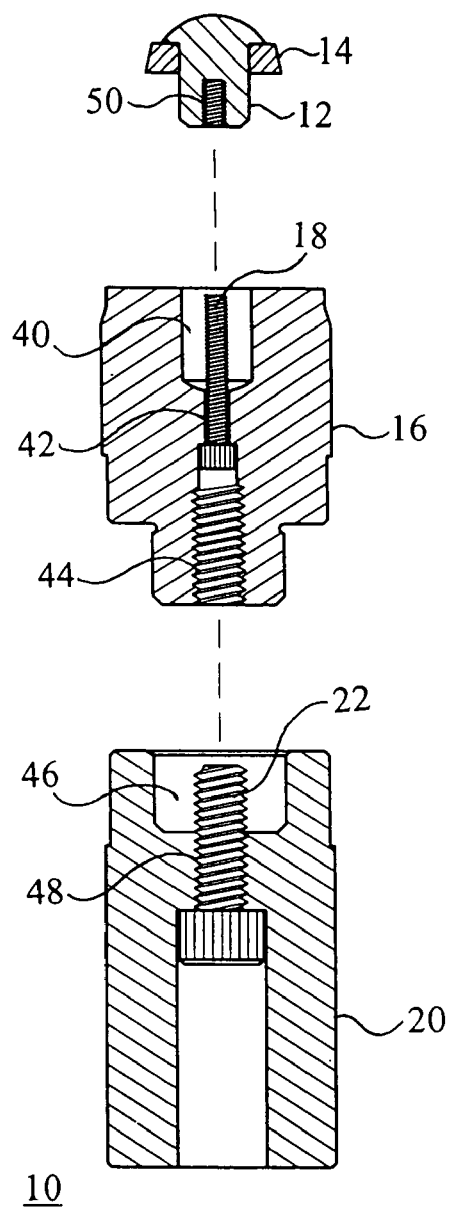
FIG. 2A is a cross-sectional view of FIG. 1 in the pre-assembly stage.

The front carrier 16 has cavities of various diameters. FIG. 2A illustrates that the inserter 12 is fixed in the cavity 40 of the front carrier 16. The bolt 18 is inserted to the cavity 42 of the front carrier 16. The cavity 44 of the front carrier 16 has internal thread on its interior. The front carrier 16, jointing with the inserter 12, has positioning lines on its brim, and has an angle pointing line 30 on its cylindrical shell.

Likewise, the rear carrier 20 has cavities of various diameters. FIG. 2A illustrates that the front carrier 16 is fixed in the cavity 46 of the rear carrier 20. The bolt 22 is inserted to the cavity 48 of the rear carrier 16. The rear carrier 20, jointing with the front carrier 16, has a number of lines 32, representing reading degrees of the angles of the astigmatism, on its cylindrical shell.

The inserter 12 is inserted through the hollow of the sleeve 14, and embedded in the cavity 40 of the front carrier 16. The purpose to use the sleeve 14 is to protect the inserter 12. When the inserter 12 is inserted into or extracted from the front carrier 16, or the moment to align the positioning lines 26 of the inserter 12 with the positioning lines 28 of the front carrier 16, it works well once the force only exerts the sleeve 14, which will free the convex head 24 of the inserter 12 from damage, like scratches, by some improper exertions.

Once the positioning lines 26 of the inserter 12 are aligned with the positioning lines 28 of the front carrier 16, the bolt 18 is inserted to the cavity 42 of the front carrier 16, and further helically tightened with the internal thread of the cavity 50 of the inserter 12 embedded in the cavity 40 of the front carrier 16; thus, the bolt 18 can intimately bind the inserter 12, the sleeve 14, and the front carrier 16.

As the angle pointing line 30 of front carrier 16 points one of the lines 32, representing reading degrees of astigmatic angles, on the rear carrier 20, it means the ellipto-cylindrical surface of the toric contact lens rotates that angle with respect to horizontal axis of the convex head 24 of the inserter 12, and the degree represents the astigmatic angle of the toric contact lens. The bolt 22 is inserted to the cavity 48 of the rear carrier 20, and further helically tightened with the internal thread of the cavity 44 of the front carrier 16 embedded in the cavity 46 of the rear carrier 20; thus, the bolt 22 can intimately bind the front carrier 16 and the rear carrier 20.

Figure 2B:
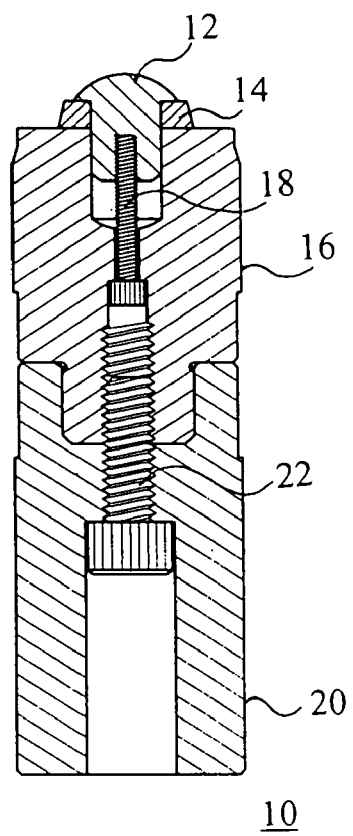
FIG. 2B is a cross-sectional view of FIG. 1 in the post-assembly stage.

The molding apparatus 10, assembled by the inserter 12, the sleeve 14, the bolts 18 and 22, the front carrier 16, and the rear carrier 20 shown in FIG. 2B, is a plain structure. By aligning the angle pointing line 30 of the front carrier with any of astigmatic angle lines 32, it can be easy to adjust the astigmatic angle on the convex outer surface of the toric lens, and the astigmatic angle of the toric contact lens can then be precisely produced by further aligning the positioning lines 26 of the inserter 12 with the positioning lines 28 of the front carrier 16.

Figures 3A, 3B:
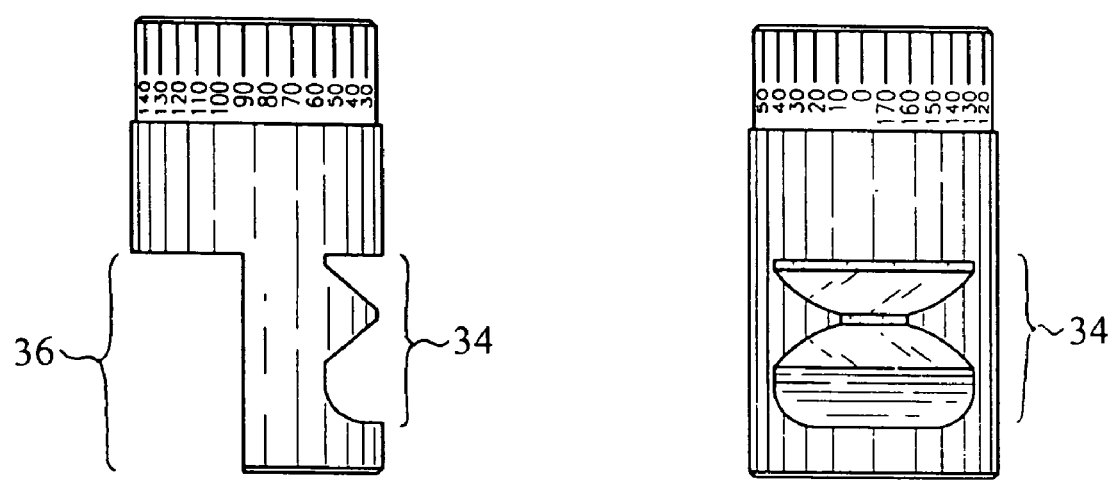
FIG. 3A is a side view of the rear convex inserter carrier of the invention.
FIG. 3B is a front view of the rear convex inserter carrier of the invention.

To ease the molding apparatus 10 installed in the mold (not shown) of machinery, a notch portion 34 and a groove portion 36 are cut to form on the rear carrier 20 shown in FIG. 3A and FIG. 3B. As the molding apparatus 10 features the adjustment of the astigmatic angle of toric lens, it is not necessary to adjust precisely an astigmatic angle, on the mold of machinery, with respect to the molding apparatus 10, simply latching the notch 34 and the groove 36 of the rear carrier 20 with a press; therefore the process to install the molding apparatus is quite easy.

As a consequence, a striking trait of the present invention is, through aligning the angle pointing line of the front carrier with any of astigmatic angle lines of the rear carrier, it is easy to adjust the astigmatic angle on the convex outer surface of toric lens; furthermore, through aligning the positioning lines of the inserter with the positioning lines of the front carrier, it can precisely produce the astigmatic degree of the toric contact lens.

Another trait of the invention is due to the plain structure of the molding apparatus which features the adjustment of the astigmatic angle of the toric lens, and it is then not necessary to adjust precisely an astigmatic angle, on the mold of machinery, with respect to the molding apparatus, simply latching the notch and the groove of the rear carrier with a press which is quite easy for the process to install the molding apparatus.

The invention may be embodied in other specific forms without departing from the spirit or essential characteristics thereof. The scope of the invention being indicated by the appended claims rather than by the foregoing description and all changes which come within the meaning and range of equivalency of the claims are therefore intended to be embraced therein.

What is claimed is:

1. A molding apparatus for generating a toric contact lens, comprising:
   a convex inserter forming a convex outer surface on said toric contact lens, a convex head of said convex inserter having a plurality of positioning lines thereon;
   a front convex inserter carrier, said convex inserter being embedded in said front convex inserter carrier, a brim thereof jointing with said convex inserter having a plurality of positioning lines thereon, a cylindrical surface of said front convex inserter carrier having an angle pointing line thereon;
   a first fastener for fastening said convex inserter with said front convex inserter carrier;
   a rear convex inserter carrier, said front convex inserter carrier being embedded in said rear convex inserter carrier, a cylindrical surface thereof jointing with said front convex inserter carrier having a plurality of astigmatic angle lines thereon; and
   a second fastener for fastening said front convex inserter carrier with said rear convex inserter carrier;
   wherein said positioning lines of said front convex inserter carrier are aligned with said positioning lines of said convex inserter, said angle pointing line of the front convex inserter carrier points one degree of said astigmatic angle lines, whereby said degree is an astigmatic angle of said toric contact lens.

2. A molding apparatus for generating a toric contact lens as recited in claim 1 further comprising a sleeve, said convex inserter inserting through a hollow of said sleeve and being embedded in said front convex inserter carrier.

3. A molding apparatus for generating a toric contact lens as recited in claim 1, wherein said first fastener is a bolt, which is screwed to internal thread of said convex inserter and used to tighten said convex inserter to said front convex inserter carrier.

4. A molding apparatus for generating a toric contact lens as recited in claim 1, wherein said second fastener is a bolt, which is screwed to internal thread of said front convex inserter carrier and used to tighten said front convex inserter carrier to said rear convex inserter carrier.

* * * * *